Patented July 28, 1953

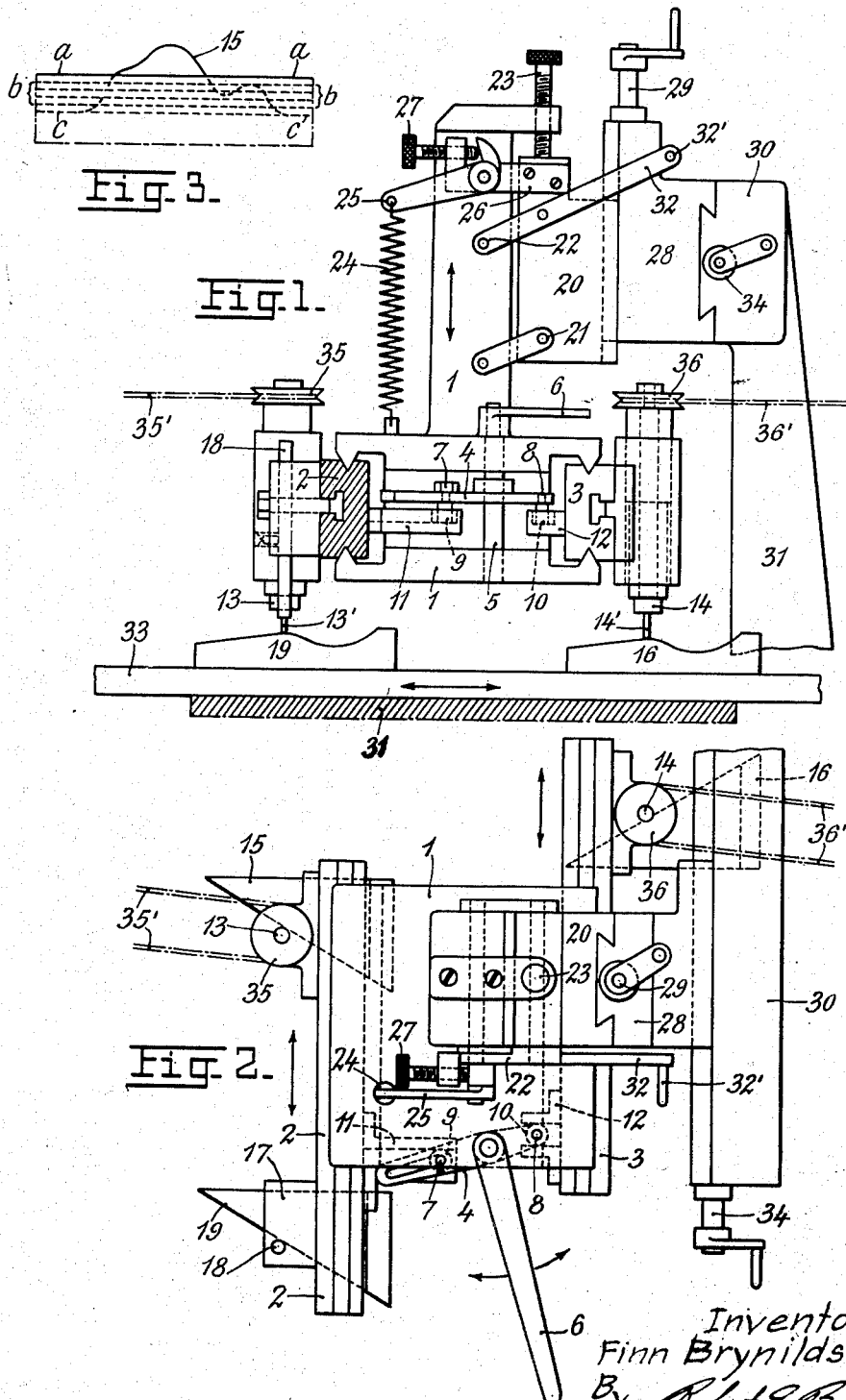

2,646,725

UNITED STATES PATENT OFFICE 2,646,725

THREE-DIMENSIONAL DUPLICATING ENGRAVING OR MILLING MACHINE

Finn Brynildsrud, Moss, Norway

Application November 29, 1949, Serial No. 129,890
In Norway December 2, 1948

8 Claims. (Cl. 90—13.1)

The present invention relates to a so-called three-dimensional duplicating or milling machine, i. e. a machine for producing parts of engines, casting moulds, matrices for forging and other objects which are circumscribed by irregular surfaces, by means of milling cutters as cutting tools. The movements of the cutters in relation to the work pieces are determined by the movements of a tracer in relation to a suitable pattern, model or guide piece the contour of which latter is to be reproduced on the workpieces.

The so-called pantographs are known in this connection but such are not suitable for all the works in question.

The object of the present invention is to provide a duplicating machine which is reliable, cheap, easy to operate and which may be mounted on an ordinary milling machine having a movable table to which the workpiece and the pattern may be fixed and a bracket for holding the duplicating accessory in adjustable proper relation to said workpiece and pattern.

The three-dimensional duplicating engraving or milling machine according to the invention comprises a tracer which is adapted to engage the surface of the pattern or model to be reproduced, and a number of cutting tools which follow the movements of the tracer and operate on the workpieces, the pattern and the workpieces being fixed to a work table movable in its own plane for performing the feeding movements, the tracer and the cutting tools being supported by parallelly controlled carrying means in such a way that said tracer and cutting tools are movable parallel to themselves and each other in the direction substantially vertical to said work table.

A particularly suitable and useful machine of this type is obtained when it is provided with an additional parallelly controlled carrying means which two carrying means are compulsively moved parallel with themselves in opposite direction in the horizontal plane and mutually parallel in the vertical plane, one of which is provided with a tracer and eventually also one or more cutting tools and the other of which is provided with one or more tools so that, when the feeder is following the contour of the pattern the cutting tools on the same carrying means will perform the same movement as the tracer while the cutting tools located on the other carrying means will perform a reflection-like movement in relation to the movement of the tracer.

The machine is provided with means which makes it possible by use of one pattern only to produce workpieces of two shapes one of which is a reflected image of the other one. In this way, for instance, both mould halves of a casting mould may be produced for an object which is symmetrical about one plane by using one pattern or model only. This is of great economical importance because such models are often very complicated to manufacture.

The following description will make intelligible the operation of the machine.

In the drawing

Fig. 1 is a side-view and

Fig. 2 a plan-view of an embodiment of the machine according to the invention.

Fig. 3 shows a workpiece as seen from one side transverse to the direction of movement of the cutting tool.

To a support member 1 are secured two sliding pieces 2 and 3 which by means of a two-armed lever 4 mounted on a shaft 5 is to be moved parallel with each other forwards and backwards in relation to the support member 1, when an arm 6 mounted on shaft 5 is turned for instance by hand to and fro as indicated by two arrows. The two-armed lever 4 is provided with two trunnions 7 and 8 each with one roller 9 and 10 which are travelling in two groove-pieces 11 and 12 which are secured one to each of the sliding pieces 2 and 3. If, as in the present case, the effective lengths of the arms of lever 4 are equal, the two sliding pieces 2 and 3 will perform parallel and equally great movements but in opposite directions. Each of the two sliding pieces 2 and 3 carries a milling spindle 13 and 14 respectively which are horizontally and vertically adjustable. These spindles carry cutters 13' and 14' respectively and are driven by belts 35' and 36' respectively, and belt pulleys 35 and 36 respectively in a suitable way. The cutters on these milling spindles are working on workpieces 15 and 16 respectively. Furthermore, on one or the other of the sliding pieces, for instance on the sliding piece 2 is mounted a horizontally adjustable holder 17 having a vertically adjustable tracer 18 co-operating with the model 19.

The support 1 is vertically movable in relation to the slide 20, for instance by means of links 21 and 22 in such a way that the two sliding pieces of the support may be moved parallel with itself and each other in the vertical direction. The movement of the support may be limited downward by means of the adjusting screw 23. Support 1 with sliding pieces 2 and 3, milling spindles 13 and 14 and tracer 18 may be counterbalanced by means of a spring 24 the tightening of which may be adjusted by lever 25 rotatably mounted on arm 26 secured to the slide 20 and operated by the adjusting screw 27 so that the tracer and the cutter can rest upon the model and the workpiece respectively with the desired working pressure.

The slide 20 is movable in vertical direction relative to the slide 28 by means of a screw 29. The slide 20 is used for coarse adjustment in the vertical direction. Said slide 28 is by means of screw 34 also movable in the horizontal direction relative to an arm 30 on the frame 31 of the machine and serves the coarse adjustment in the horizontal direction. Arm 32 being an extension of link 22 is operated by the handle 32' and is moved up and down for moving the support means and consequently the tracer and cutters in vertical direction independent of the controlled movement of the tracer in the model. The work-pieces 15 and 16 and the model 19 are secured to a common slide table 33 which may be moved forwards and backwards upon the frame of the machine transverse to the direction of movement of the sliding pieces 2 and 3. The slide table which is moved in a suitable way, performs the feeding movement.

As an example to show the operation of the machine when producing two parts 15 and 16 which may be the male and female part respectively of a matrix serving to forge, simultaneously, the upper and lower half of an object which is symmetrical in one plane. Thus, in one plane, one of the matrices is the reflected image of the other one. Therefore, it is only necessary to use one half of the model.

The process of working is the following.

After having secured the work pieces 15 and 16 and the pattern or model 19 to the work table 33, and the milling spindles 13 and 14 with the cutters 13' and 14' respectively and same and the tracer 18 are fixed and adjusted in correct horizontal distance relative to each other on the sliding pieces 2 and 3, the slides 20 and 28 are operated for coarse adjustment and fixed. Fine adjustment is then performed by means of the vertically adjustable milling spindles, and/or the vertically adjustable tracer. The spring 24 is regulated conveniently tight by means of the adjusting screw 27 for proper pressure of the tracer and the tools against the model and workpieces respectively. The dimension of the cut in the vertical direction is thereupon adjusted by the adjusting screw 23, and by means of the arm 6 the sliding pieces 2 and 3 are moved forwards and backwards so that the tracer 18 is gliding over the model and the cutters 13' and 14' are working on the work-pieces 15 and 16 correspondingly. During this the work table 33 is performing feeding movements transverse to the direction of movement of the sliding pieces.

This will appear from Fig. 3 showing a workpiece, for instance, 15 as seen from the left in Fig. 1. The full line $a$—$a$ represents the first cut. The next cuts to be made will then follow the dotted lines $b$—$b$ and the last cut the dotted line $c$—$c$. When the entire horizontal surface which corresponds with one cut ($a$—$a$) is worked, a new cut ($b$—$b$ and at last $c$—$c$) is made by at first adjusting screw 23 whereupon the process is repeated each time as before. With models with steep grades it is of advantage to lift the system 1, 2, 3 by the arm 32 and the handle 32' in order to facilitate the passage of the tracer over the model.

In this example is shown two workpieces only which are worked by each one milling spindle, but it will be understood that the machine can be provided with any number of milling spindles which might be found suitable, so that same can be made for working on several workpieces at the same time.

Furthermore, the two-armed lever 4 shown here can be made with arms of unequal length so as to vary the ratio of the length of the arms as desired, whereby it is possible to produce work-pieces the shape of which will be distorted in one direction relative to the shape of the model. When using a model for instance having a circular horizontal cross section it can be obtained from approximately elliptic workpieces the eccentricity of which will depend upon the ratio of the length of the arms of the two-armed lever. In such cases the milling spindle and the tracer will have to be mounted each on one sliding piece.

I claim:

1. A three-dimensional copying milling machine comprising a tracer arranged for vertical and horizontal movement over the surface of the pattern to be copied, at least one cutting tool which is adapted to follow the movements of the tracer and to reproduce the shape of the pattern on a work-piece, a work table to which the pattern and the work-piece are securable and which is movable in its own plane to effect feeding movements of the pattern and the work-piece, and supporting means carrying at least one sliding member having bearings for each cutting tool and the tracer, said supporting means being movably suspended in a slidable mounting for vertical movement in response to vertical movements of said tracer, said sliding member being movable at an angle with respect to the direction of movement of the suspended supporting means.

2. A machine as defined in claim 1, wherein adjustable spring means are provided for adjustably balancing the weight of the suspended supporting means so that the said supporting means may exert an upward force, a downward force and a nil force, corresponding to the pressure of the tracer against the surface of the pattern and of each cutting tool against the work-piece.

3. A machine as defined in claim 1 wherein the support means is vertically movable.

4. A machine as claimed in claim 1 wherein each sliding member is mounted for sliding movement in a plane at right angles to the direction of movement of the support means.

5. A machine as defined in claim 1 wherein there are at least two sliding members and each sliding member is movable parallel with another sliding member but in opposite directions with the same velocity, whereby when the milling tool and tracer are mounted on the same sliding member, copies of the pattern are produced, and when the milling tool and tracer are mounted on a different member, mirror image copies of the pattern may be produced.

6. A machine as defined in claim 1 wherein there are at least two sliding members and each sliding member is pivotally connected to opposite ends of a lever having arms of equal length and having a fulcrum which is stationary relative to the sliding member.

7. A machine as defined in claim 1 wherein there are at least two sliding members and said sliding members are connected to opposite ends of a lever having arms of unequal length, whereby said sliding members are movable at proportional but different velocities, and when the milling tool and tracer are mounted on a different member a mirror image of the pattern is produced which is distorted in one direction.

8. A machine as defined in claim 1 wherein there are at least two sliding members and said sliding members are pivotally connected to opposite ends of a lever having arms of unequal length and having a fulcrum stationary relative to the sliding members.

FINN BRYNILDSRUD.

References Cited in the file of this patent

UNITED STATES PATENTS

| Number | Name | Date |
|---|---|---|
| 782,242 | Hanson | Feb. 14, 1905 |
| 972,033 | Steers | Oct. 4, 1910 |
| 1,874,810 | Saives | Aug. 30, 1933 |
| 1,960,757 | Shaw et al. | May 29, 1934 |
| 2,182,551 | Edwards | Dec. 5, 1939 |
| 2,207,786 | Dixon | July 16, 1940 |
| 2,244,190 | Ehrenberg | June 3, 1941 |
| 2,303,956 | Rossbacher | Dec. 1, 1942 |
| 2,311,943 | Holcomb | Feb. 23, 1943 |
| 2,349,171 | Jackson | May 16, 1944 |

FOREIGN PATENTS

| Number | Country | Date |
|---|---|---|
| 523,743 | Great Britain | July 22, 1940 |